Figure 1:
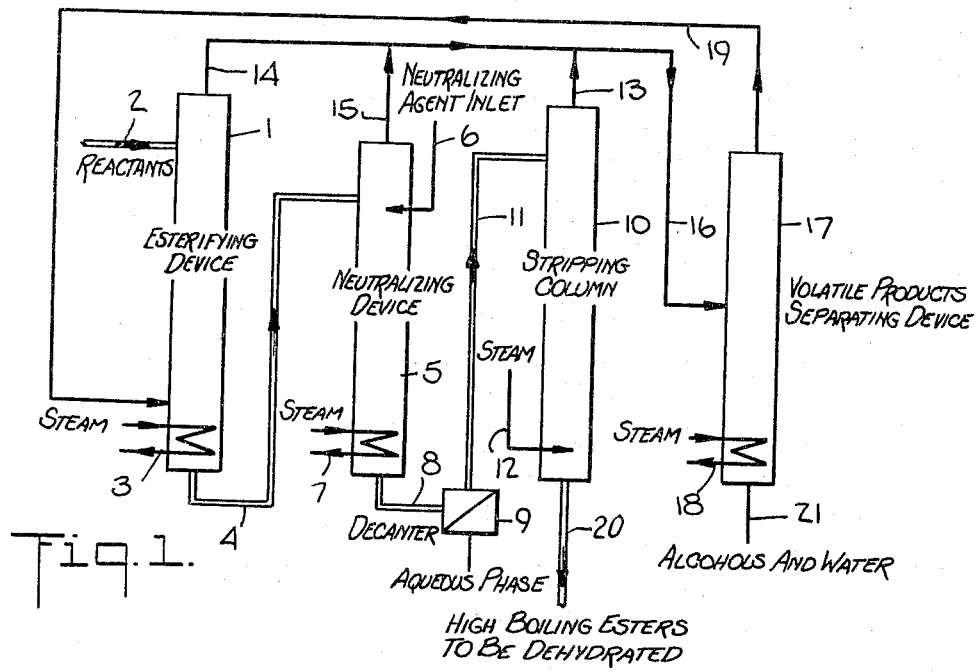

INVENTOR.
LOUIS ALHERITIERE

United States Patent Office  3,328,269
Patented June 27, 1967

3,328,269
PURIFICATION OF HIGH-BOILING ESTERS FROM ALCOHOL BY DISTILLATION UNDER PRESSURE
Louis Alheritiere, Melle, Deux-Sevres, France, assignor to Les Usines de Melle (Societe Anonyme), Saint-Leger-les-Melle, France, a corporation of France
Filed Aug. 4, 1966, Ser. No. 573,754
Claims priority, application France, May 8, 1961, 861,154
4 Claims. (Cl. 203—92)

This application is a continuation-in-part of copending application Ser. No. 188,571 filed Apr. 18, 1962, now abandoned.

This invention relates to a process for purifying high-boiling esters, particularly those made from higher carboxylic acids and alcohols.

The principal object of the invention is to provide a simple, efficient process for such purification.

I have found in accordance with my invention that I may carry out such purification by steam distilling at superatmospheric pressure a mixture comprising a monohydroxy primary alcohol containing from 4 to 12 carbon atoms and an ester resulting from esterification of a carboxylic acid containing at least 6 carbon atoms with said alcohol. The carboxylic acids and the alcohols may be aromatic or aliphatic including, for example, alkyl, cycloalkyl, or aralkyl compounds.

The "high-boiling esters" involved in the present invention are carboxylic acid esters having a high boiling point and which are mainly used as plasticizers or lubricating agents. These high-boiling esters are preferably those produced from aromatic or aliphatic dicarboxylic acids, such as phthalic, adipic, azelaic and sebacic acid, but without limitation, and monohydric primary alcohols having from 4 to 12 carbon atoms in their molecule, such alcohols being either aliphatic (preferably having at least 6 carbon atoms, for example, hexyl alcohols, octyl alcohols, etc.) or cycloaliphatic (such as cyclohexanol or methylcyclohexanols and the like) or araliphatic (for example benzyl alcohol and the like) or else heterocyclic alcohols (such as tetrahydrofurfuryl alcohol and the like). The present invention is not concerned with esters of low molecular weight alcohols, for which the said invention does not provide as substantial advantages as for esters of alcohols having a relatively high molecular weight and consequently a higher boiling point. The invention may also be applied to esters produced from long-chain aliphatic monocarboxylic acids (such as stearic or oleic acids and the like) and the monohydric primary alcohols defined above.

For manufacturing such high-boiling esters, the esterification reaction is customarily carried out with the use of a molar excess of alcohol with respect to acid, so as to achieve practically complete conversion of the acid. The molar excess of alcohol is generally in the range 10–20%.

Subsequent separation of the excess alcohol from the raw ester is generally performed by entrainment of the alcohol with steam (stripping). The steam consumption for such entrainment depends upon the alcohol species, the separation process, whether continuous or discontinuous, and the extent of alcohol elimination desired. The content of volatile substances in the ester depends upon the presence of small proportions of alcohol remaining in the final ester. The alcohol content can be determined by measuring the amount of hydroxyl groups present in the ester. The buyers generally demand low alcohol content, of the order of 5–10 millimoles per kilogram of ester.

It has now been found that entrainment with steam of the excess high-boiling alcohol from the raw ester is made considerably easier by carrying out such entrainment at a pressure above atmospheric pressure, preferably in the range 0.5–8 kg./cm.$^2$ and more particularly in the range 0.5–4 kg./cm.$^2$ above atmospheric pressure. Depletion of the alcohol contained in the high-boiling ester is improved by the use of a superatmospheric pressure. There results a lowering of the steam consumption and consequently a diminution of the size of the apparatus for a given ester output is possible.

The advantages above set forth are substantial for separation of any and all of the alcohols of the classes involved but are the more considerable, the higher the boiling point of the involved alcohol. Thus, in the case of hexyl alcohols, the lowering of steam consumption is still relatively slight, but is considerably higher for octyl alcohols (iso-octyl alcohol or ethyl hexyl alcohol, for example) and far higher for decyl and higher alcohols.

A further advantage of carrying out the distillation under pressure in accordance with this invention is the saving of heat energy. Because of the superatmospheric pressure, the temperature of the vapors issuing from the head of the alcohol entrainment column is above 100° C. Accordingly it is possible to recover and use the heat carried by these vapors to effect certain heating operations which are customarily performed with low pressure steam.

Such heat recovery and use may be realized in various ways. For example, by indirect heat exchange with the head vapors from the column it is possible to produce steam at a lower pressure, which steam may be used for effecting some heating operation in the factory; or else it is possible to realize a direct heat exchange in a heating device, using the said heat vapors instead of steam customarily used.

Of course, such heat recovery and use are easier if the alcohol entrainment operation is carried out continuously. Moreover, the heat recovery is most conveniently realized when the heat re-use can be accomplished in the high-boiling ester production plant itself.

Figure 2:
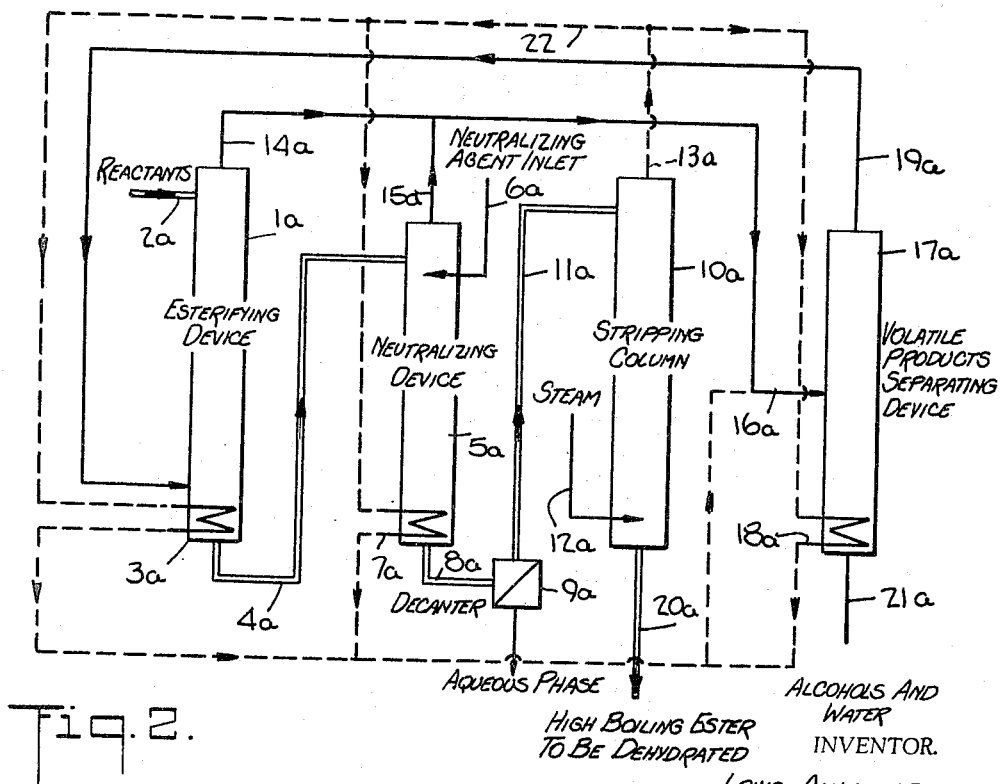

This invention will be more fully understood by reference to the accompanying drawings in which FIG. 1 is a flowsheet schematically illustrating the known process and FIG. 2 is a flowsheet schematically illustrating one embodiment of the process of this invention.

Referring to FIG. 1, the reactants are fed through pipe 2 to the head of the esterifying tower 1 which is heated by circulating steam through heat exchanger 3 at its base. The impure esterification product is withdrawn from esterifying tower 1 in pipe 4 through which it is conducted to neutralizing tower 5. The neutralizing agent is fed to the neutralizing tower 5 through pipe 6. The neutralizing tower 5 is heated by circulating steam in heat exchanger 7. The immiscible mixture of ester-containing organic phase and aqueous phase is withdrawn from the bottom of neutralizing tower 5 in pipe 8 through which it is fed to decanter 9. The aqueous phase is separated from the organic phase in decanter 9 and the organic phase introduced into stripping column 10 through pipe 11. The mixture in stripping column 10 is heated by steam at ordinary pressure which enters the mixture at the foot of the column through pipe 12. Volatile products from stripping column 10 exit at the top of the column through pipe 13 where they, together with any volatile products collected from the top of esterifying tower 1 and neutralizing tower 5 in pipes 14 and 15 at the top of these towers are conducted through pipe 16 to the volatile products separating tower 17 which is also heated by steam circulating through heat exchanger 18. The volatile products comprising excess alcohol and a water entrainer, if used, are returned to esterifying tower 1 through pipe 19 for reuse. The ester which is wet with water is withdrawn at the foot of stripping column 10 through pipe 20 for further purification. Alcohol and water are withdrawn from the foot of the volatile products separating tower 17 through pipe 21.

Reference is now made to FIG. 2 illustrating one embodiment of the process of this invention. The elements in FIG. 2 corresponding to like elements in FIG. 1 are similarly marked except for the superscript "$a$". The important difference between the apparatus of FIGS. 1 and 2 is that the steam which heats the mixture in stripping column 10$a$ of FIG. 2 is injected at a high pressure through pipe 12$a$. The result is that the vapors exit from this column at a high temperature so that their heat values can be used to heat the esterifying tower 1$a$, the neutralizing tower 5$a$ and the volatile products separating tower 17$a$ by circulating the vapors through the system generally represented by 22 which includes heat exchangers 3$a$, 7$a$ and 18$a$. Useful volatile products such as alcohols and water entrainer, if used, from the stripping column 10$a$ circulate with the high temperature vapors from the said column and are fed to the volatile products separating tower 17$a$ through pipe 16$a$ as shown.

The following non-limiting examples will illustrate the advantages of this invention.

EXAMPLE 1

Treatment of dioctyl phthalate

The ester to be purified was dioctyl phthalate containing approximately 10 moles percent of free octyl alcohol. The separation of the alcohol was carried out continuously in a distilling column.

Working at atmospheric pressure, in accordance with conventional processes, it was necessary, for obtaining final dioctyl phthalate containing less than 5 millimoles of octyl alcohol per kilogram, to supply to the base of the column 2.5 kg. of steam per kg. of dioctyl phthalate.

Working in accordance with the present invention, at a pressure of 2 kg./cm.$^2$ above atmospheric pressure, the steam consumption for treating the same starting material and producing dioctyl phthalate of the same quality was only 1.5 kg. of steam per kg. of dioctyl phthalate. The saving of steam was thus of 1 kg. per kg. of phthalate.

The other units of the dioctyl phthalate production plant necessitate a total amount of steam of 1.4 kg. per kg. of phthalate, such steam being supplied to suitabale heating devices in which the temperature should be between 100–105° C.

Operating in accordance with conventional processes (i.e., carrying out the alcohol separation step at atmospheric pressure), the vapors issuing from the head of the alcohol entrainment column were at a temperature of 98–100° C. so that no heat exchange was possible in the heating devices of the other units of the phthalate production plant.

On the contrary, operating in accordance with this invention, at a pressure of 2 kg./cm.$^2$ above atmospheric pressure, the temperature of the vapors from the head of the column was 125° C., so that it was possible to recover the heat of such vapors for heating without cost the other units of the plant, the heating temperature of such units being always comprised between 100–105° C.

Owing to such heat recovery, the additional heat saving provided by the process of the invention reaches 1.4 kg. of steam per kg. of dioctyl phthalate. The total heat saving in the present process as compared with the conventional process carried out at atmospheric pressure can reach 2.4 kg. of steam per kg. of dioctyl phthalate.

Furthermore, for a given phthalate output the cross section of the alcohol entrainment column may be diminished by 40%.

Working at a pressure of 3 kg./cm.$^2$ above atmospheric pressure, the steam consumption in the alcohol separation column was only 1.3 kg. per kg. of dioctyl phthalate.

Accordingly, since the amount of heat which can be recovered by heat exchange and re-used for heating the other units of the distillation plant will be only 1.3 kg. instead of the required 1.4 kg. per kg. of phthalate, it is necessary to supply to the plant an additional amount of 0.1 kg. of steam, from an external source, per kg. of phthalate. Under such circumstances the additional saving as compared with the operation carried out at a superatmospheric pressure of 2 kg./cm.$^2$ was only 0.1 kg. of steam per kg. of phthalate.

Such additional steam saving becomes lower and lower as the pressure increases. Moreover, the possible increase of pressure is limited in actual practice by the increasing risk of ester hydrolysis at too high temperature.

EXAMPLE 2

Treatment of other dioctyl esters

The process of Example 1 was repeated to separate octyl alcohol from dioctyl adipate, dioctyl sebacate and dioctyl azelate, and the results and heat savings were substantially the same.

Generally all high-boiling octyl esters may be freed from octyl alcohol by means of the present process with the same advantages as disclosed in Example 1, becaue the conditions of alcohol entrainment by steam depend upon the species of the alcohol, not upon the species of the ester.

EXAMPLE 3

Treatment of didecyl phthalate

Didecyl phthalate to be treated contained approximately 10 moles percent of free decyl alcohol. The separation of the alcohol was carried out continuously in a distillation column.

Working at atmospheric pressure so as to produce a didecyl phthalate containing no more than 5 millimoles of decyl alcohol per kilogram, a steam expense of 8 kg. per kg. of didecyl phthalate was necessary.

Working at a pressure of 3 kg. per cm.$^2$ above atmospheric pressure, the steam consumption was only 3.5 kg. per kg. of didecyl phthalate, i.e., a heat saving of 4.5 kg. of steam per kg. of phthalate.

Moreover, owing to the recovery and re-use of heat, as described in Example 1, an additional heat saving corresponding to 1.5 kg. of steam per kg. of phthalate can be realized. The total possible heat saving thus amounts to 6 kg. per kg. of phthalate.

In the case of other high-boiling decyl esters being treated in accordance with the present invention, the heat saving is substantially the same.

EXAMPLE 4

Treatment of dioctyl adipate

Dioctyl adipate to be treated contained approximately 5 moles percent of free octyl alcohol. The separation of the alcohol was carried out continuously in a distillation column.

Working at atmospheric pressure, the separation step required a steam expense of 2.5 kg. per kg. of dioctyl adipate.

Working at a pressure of 0.8 kg. per cm.$^2$ above atmospheric pressure, the separation step required only a steam expense of 2 kg. per kg. of dioctyl adipate.

EXAMPLE 5

Treatment of didecyl stearate

Didecyl stearate to be treated contained approximately 10 moles percent of free decyl alcohol. The separation of the alcohol was carried out continuously in a distillation column.

Working at atmospheric pressure, the separation step required a steam expense of 6 kg. per kg. of didecyl stearate.

Working at a pressure of 7 kg. per cm.² above atmospheric pressure, the separation step required only a steam expense of 3 kg. per kg. of didecyl stearate.

What is claimed is:

1. A process which comprises steam distilling a mixture comprising a monohydroxy primary alcohol containing from 4 to 12 carbon atoms and an ester resulting from esterification of a carboxylic acid containing at least 6 carbon atoms with said alcohol at a pressure of from about 0.5 to about 4 kilograms per square centimeter above atmospheric pressure to substantially separate said alcohol from said ester.

2. A process for the purification of a raw ester resulting from esterification of an organic acid selected from the group consisting of aromatic and aliphatic mono and dicarboxylic acids containing at least 6 carbon atoms with a molar excess of a monohydroxy primary alcohol containing from 4 to 12 carbon atoms, said ester still containing said alcohol, which comprises steam distillation of the said raw ester at a pressure of from about 0.5 to about 4 kilograms per square centimeter above atmospheric pressure to substantially separate said alcohol from said ester.

3. A process as in claim 2 wherein the alcohol is octyl alcohol.

4. A process as in claim 2 wherein the alcohol is decyl alcohol.

References Cited

UNITED STATES PATENTS

| | | | |
|---|---|---|---|
| 2,508,911 | 5/1950 | Garner | 203—33 |
| 2,646,393 | 7/1953 | Hughes | 260—475 X |
| 2,778,849 | 1/1957 | Ackelsberg | 260—475 |
| 3,054,726 | 9/1962 | Fields | 55—70 |
| 3,073,754 | 1/1963 | Aroyan | 203—48 |

NORMAN YUDKOFF, *Primary Examiner.*

D. EDWARDS, *Assistant Examiner.*